United States Patent [19]
Meckstroth

[11] Patent Number: 5,967,925
[45] Date of Patent: Oct. 19, 1999

[54] PULLEY WITH CONTROLLED SURFACE IRREGULARITY FOR AN INTERNAL COMBUSTION ENGINE

[75] Inventor: Richard John Meckstroth, Northville, Mich.

[73] Assignee: Ford Global Technologies, Inc., Dearborn, Mich.

[21] Appl. No.: 09/050,206

[22] Filed: Mar. 30, 1998

[51] Int. Cl.⁶ ................................................ F16H 55/36
[52] U.S. Cl. ........................ 474/175; 474/174; 474/168
[58] Field of Search .................................. 474/166, 168, 474/181–189, 174–177, 237, 242–247, 190–194; D8/360; 254/391

[56] References Cited

U.S. PATENT DOCUMENTS

| | | |
|---|---|---|
| 1,601,662 | 9/1926 | Abbott . |
| 2,176,335 | 10/1939 | Gray ......................................... 474/175 |
| 4,031,761 | 6/1977 | Fisher et al. ........................ 474/170 X |
| 4,367,067 | 1/1983 | Chao ................................... 474/175 X |
| 4,781,660 | 11/1988 | Amataka et al. . |
| 4,840,607 | 6/1989 | Hitchcock et al. ................. 474/168 X |
| 4,898,567 | 2/1990 | Tatara et al. . |
| 4,900,294 | 2/1990 | Schneeberger ...................... 474/174 X |
| 4,905,361 | 3/1990 | Morishita et al. . |

FOREIGN PATENT DOCUMENTS

| | | | |
|---|---|---|---|
| 501860 | 11/1954 | Italy ....................................... 474/175 |

*Primary Examiner*—Tamara L. Graysay
*Assistant Examiner*—Marcus Charles
*Attorney, Agent, or Firm*—Jerome R. Drouillard

[57] ABSTRACT

An accessory drive system for an internal combustion engine includes a multi-ribbed belt and pulley system. Shear generators are machined, formed or molded and extend axially from the driving pulley's faces such that the shear generators expand the drive belt in a plurality of regions. The shear generators are formed as either spheroids projecting into the V of the V-pulley such that the spheroids extend from two faces of adjacent grooves at approximately the midpoint between the root and apex of the V, or as shifted circumferential grooves of a multi-ribbed pulley having a continuous wave pattern. These shear generators cause a plurality of localized high tension regions at the highest pressure zone of the belt/pulley friction interface, improving circumferential friction, and therefore torque capacity, with minimal effect on belt wear due to their smoothness.

4 Claims, 3 Drawing Sheets

PULLEY WITH CONTROLLED SURFACE IRREGULARITY FOR AN INTERNAL COMBUSTION ENGINE

BACKGROUND OF THE INVENTION

1. Field of the Invention

This invention relates to a drive pulley system for an internal combustion engine. More particularly, the present invention relates to an improved pulley system which produces enhanced traction between the pulley and a drive belt in wet operating conditions.

2. Disclosure Information

Pulley drive systems for powering the accessories of internal combustion engines are used to transmit power through a belt, with the belt making frictional contact with the face of the pulleys. The use of pulley systems to accomplish the transfer of power has been proven to have certain deficiencies inasmuch as pulleys rely upon friction for their motive force. Once the friction is lost between the pulley and the belt, as may be the case with an accumulation of water on the surface of the pulley system, slip occurs. Water on the surface of the pulley system causes the coefficient of friction between the belt and the pulley faces to decrease, causing either an objectionable squealing noise which will be audible to the driver as the belt slips or a change in speed of the driven accessory.

Currently, conventional multi-ribbed belts and pulleys are used on several drive systems with automobile engines. The pulley's circumferential grooves for receiving friction belts such as multi-rib belts have grooved surfaces which are very smooth; therefore, the coefficient of friction between the surfaces of the grooves relative to the friction belt is very low. Prior work has focused on improving friction within different belt systems or has focused on modifying the belt itself. Due to the different flexural properties of the belts, a solution that corrects for the loss of friction with one belt system cannot be readily applied to solving the same problem with another belt system.

U.S. Pat. No. 1,601,662 describes transferring power to a laterally flexible belt with a steel laminate, used with either a variable effective diameter or a fixed diameter pulley. This belt is very different from a multi-ribbed belt, which is laterally fixed and rigid. Also the tensions associated with a variable speed gear are higher than those associated with a constant speed gear.

U.S. Pat. No. 4,781,660 describes transferring power to a chain belt operating at high speed at a small wrap angle. A V-pulley described in the U.S. Pat. No. 4,781,660 comprises a pair of conical pulley faces that the chain belt contacts, with each being provided with a rough surface. The smaller wrap angle taught would also lower the total torque capacity between a belt and the pulley. In addition, the frequency of the roughness defined and shown in this is too high to be effective with a multi-ribbed belt, because the multi-ribbed belt would lift out of the fixed multi-ribbed belt pulley.

U.S. Pat. No. 4,898,567 describes a V-block belt system aimed at reducing noise levels during operation. The system relies on the assistance of a special belt with intermittently spaced V blocks. The type of belt taught differs significantly from a smooth multi-ribbed belt.

U.S. Pat. No. 4,905,361 describes a conventional multi-ribbed pulley, designed to work with a multi-ribbed belt. The invention teaches the addition of axial grooves which extend in an axial direction over a surface of the pulley in which the circumferential groove is formed, and a higher friction surface which is formed by roughening the surface. However, with this invention, combined with the characteristic hardness of the rib stock rubber of at least 65 shore durometer of all known K section V-ribbed belts, the belt would simply be elevated out of the grooves and would ride across the top of the bumps with less effective wrap surface. Hence, there would be lower friction and subsequently lower belt/pulley torque capacity than a pulley without the roughness as described in this patent.

It is known that modified multi-ribbed belts having smaller V angles perform slightly better under wet-slip conditions than conventional multi-ribbed belts. This could be because the tips of the pulley dig into the belt rib valleys and create a local pressure wedging in this area. The sharper, longer V of the belt provides full rubber to steel contact during the wet slip situation, which prevents hydroplaning as the belt digs into the bottom of the pulley. However, this technique causes undue wear to the belts because the tip loads will wear out the rib section of the belt, eliminating future point contacts.

The current invention applies the concept of creating localized high pressure areas through the pulley's geometric characteristics. The system modifies the amount of space between adjacent conical faces of the pulley, thereby creating high pressure areas between the pulley and the belt at the belt/pulley interface.

Clearly, it is desirable to be able to have an improved multi-ribbed belt pulley system that will compensate for wet conditions and prevent the belt from slipping on the pulley, thereby preventing a squealing sound as the belt loses traction.

SUMMARY OF THE INVENTION

An accessory drive system for an internal combustion engine comprises a plurality of driven pulleys, with at least one of the driven pulleys being operatively connected with a rotating accessory. The drive system further comprises a multi-ribbed belt. A driving pulley is attached to a driving shaft of the engine such as a crankshaft. The drive pulley comprises at least one pair of conical pulley faces defining a circumferential groove in the driving pulley and a plurality of shear generators extending axially inwardly from the conical faces. The shear generators expand the drive belt in a plurality of regions as the belt comes into contact with the driving pulley.

According to another aspect of the present invention, the shear generators may comprise smooth spherical protrusions or spheroids. The spheroids extend from the pulley faces into adjacent pulley grooves such that the spheroids cause a plurality of localized high tension regions at the highest pressure zone of the belt/pulley friction interface. Preferably, the V-shaped grooves contain the spheroids at approximately the midpoint between the root and the apex of the V. Those skilled in the art will appreciate in view of the disclosure that the spheroids could be replaced with a similar geometric shape that may be more manufacturable.

According to another aspect of the present invention, the shear generators may comprise the pulley grooves themselves, with the grooves being shifted left and then right in a continuous wave pattern along the circumference of the pulley. The wave pattern repeats at approximately 20° along the circumference of the pulley.

It is an advantage of the present system that a high tension area is created in a belt at the highest pressure zone of the belt/pulley friction interface.

It is another advantage of the present invention that the smooth surfaces of spheroidal shear generators according to this invention create tension within the belt that is within the belt's elastic range and which does not cause undue wear to the belt.

It is another advantage of the present invention that circumferential friction is increased, by the present shear generators, thereby increasing torque capacity.

It is another advantage of the present invention that the accessory drive system will work well under wet slip conditions by smoothly allowing for improved friction between the belt and pulley, thereby maintaining speed of driven items.

It is yet another advantage of the present invention that a squealing noise will not be audible.

Other objects, features, and advantages of the present invention will become apparent to the reader of this specification.

BRIEF DESCRIPTION OF THE DRAWINGS

FIG. 3b is a sectional view of the driving pulley of FIG. 3a.

DETAILED DESCRIPTION OF PREFERRED EMBODIMENTS

Figure 1:
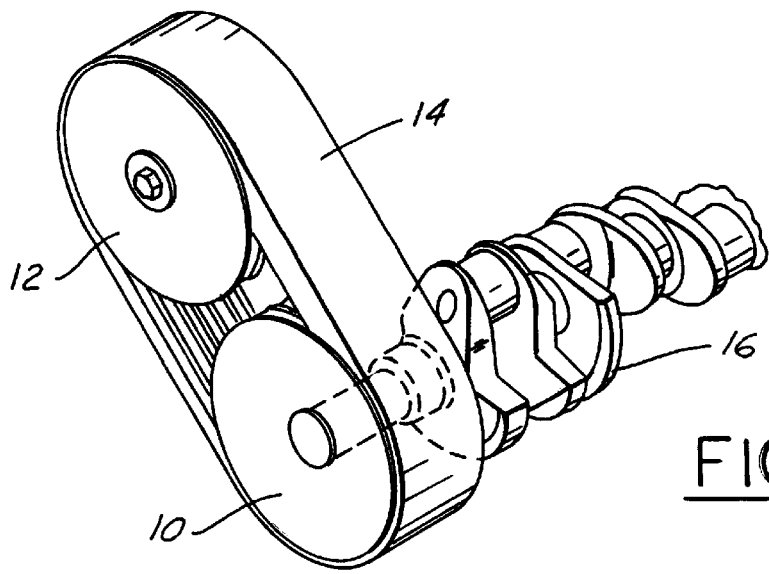
FIG. 1 is a schematic representation of an accessory drive system for an internal combustion engine according to the present invention.

As shown in FIG. 1, an accessory drive system according to the present invention, includes driving pulley 10, which is connected with driven pulley 12 by multi-ribbed belt 14. Driving pulley 10 is attached to driving shaft 16 (such as a crankshaft) of an engine. The present system is used to transmit power from an internal combustion engine to accessories (not shown) within the engine's accessory drive system. Such accessories frequently include an alternator, a power steering pump, an air conditioning compressor, a secondary air pump for emission controls, and other rotating devices known to those skilled in the art.

Figure 2:
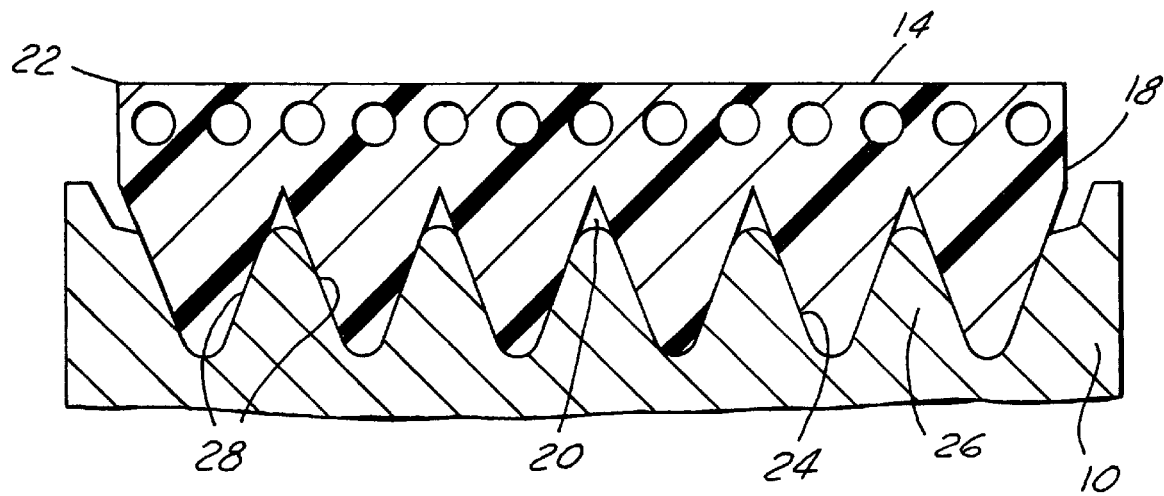
FIG. 2 is a schematic of a multi-ribbed belt and pulley according to the present invention.

Flexible multi-rib belt 14 is trained over pulleys 10 and 12. As shown in FIG. 2, the working face of multi-rib belt 14 carries a plurality of adjacent V-section ribs 18 with grooves 20 extending therebetween. Belt 14 has a top portion 22 which is flat. Ribs 18 and grooves 20 are parallel to each other and extend over the continuous tractive face of multi-ribbed belt 14. Belt 14 may be made of conventional elastomeric materials, such as neoprene, and may include cords for strengthening.

Pulleys 10 and 12 have a plurality of grooves 24 and ribs 26. Grooves 24 are shaped and dimensioned so as to receive belt ribs 18 with little clearance space when belt 14 is in contact with either pulley 10 or pulley 12. Pulley ribs 26 are defined by conical pulley faces 28 of pulley 10. It should be noted that the cross sectional shape of multi-rib belt 14 may vary and the shape of the ribs in cross section may also be varied according to this invention.

Figure 3A:
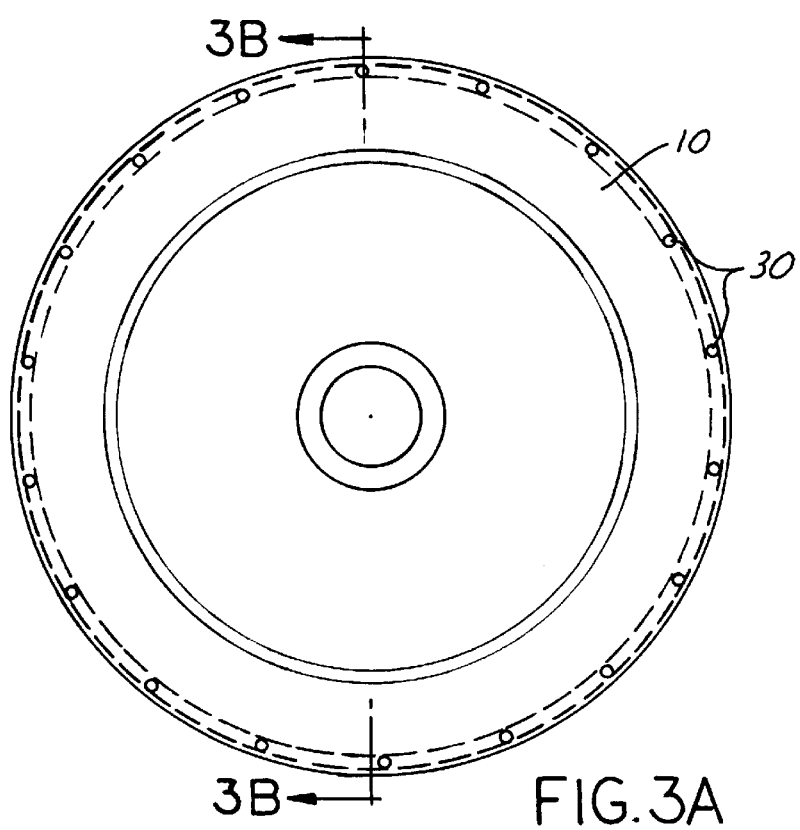
FIG. 3a is a side view detail of a driving pulley according to one aspect of the present invention showing spheroid locations at approximately 20° intervals along the circumference of the pulley.
Figure 3B:
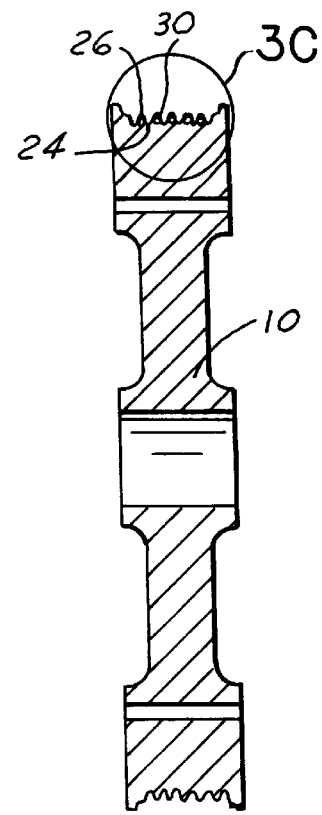
Figure 3C:
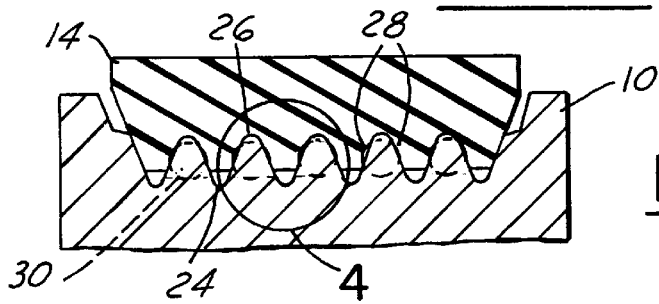
FIG. 3c is a close-up of FIG. 3b, showing the placement of spheroids within the conical pulley faces.

As shown in FIGS. 3a, 3b and 3c driving pulley faces 28 are modified by means of forming, molding or machining with spheroids 30, which act as shear generators according to one aspect of the invention by extending axially into pulley grooves 24. As shown in FIG. 3a, spheroids 30 are located periodically around the circumference of driving pulley 10. As shown more specifically in FIG. 4, spheroids 30 are optimally located approximately at midpoint 32 between root 34 and apex 36 of the V of pulley rib 26, which is defined by adjacent pulley faces 28.

Figure 4:
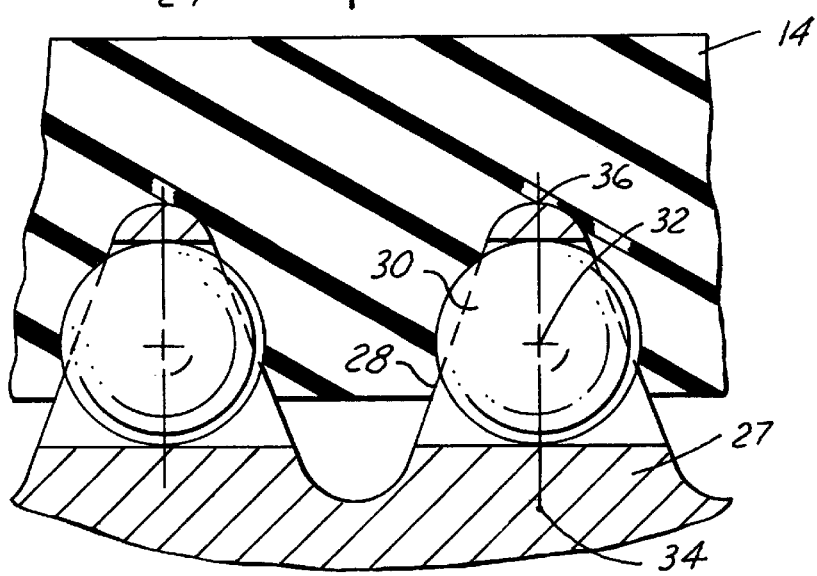
FIG. 4 is an illustration of a driving pulley including spheroids according to one aspect of the present invention.

As shown in FIG. 4, spheroids 30 reduce the area within the grooves 20 by extending axially from two pulley faces 28 into adjacent pulley grooves 24. Preferably, spheroids 30 are smooth.

Figure 5:
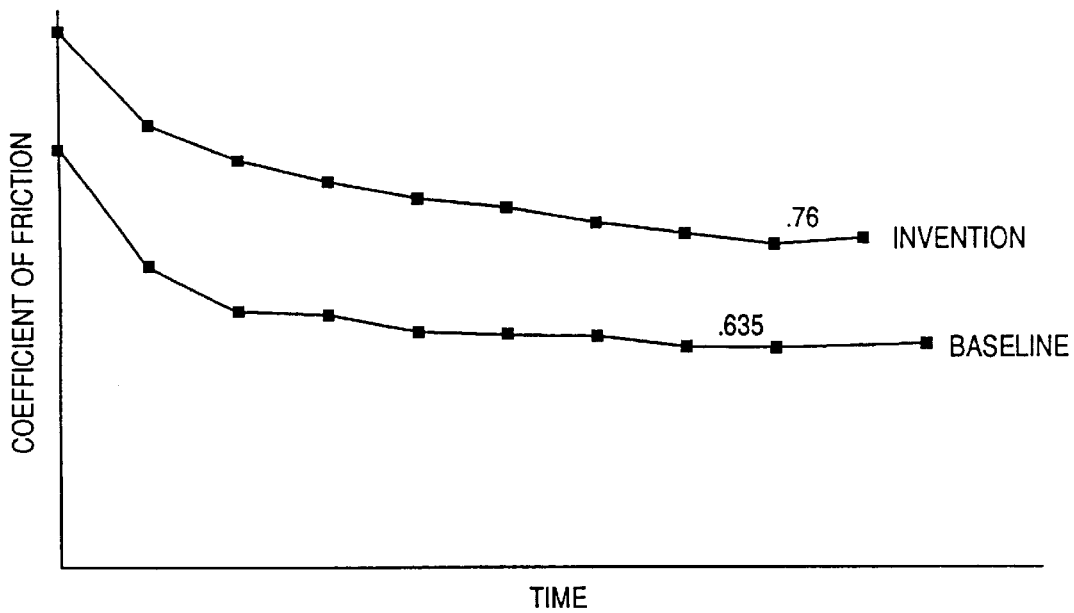
FIG. 5 is a plot of results from a friction test stand showing a comparative analysis of a pulley according to the present invention and a conventional prior art pulley.

FIG. 5 compares the coefficient of friction of a conventional multi-ribbed pulley with a pulley according to the present invention. The test equipment and methods for determining the friction behaviors of various friction materials will be briefly discussed.

A new dynamic belt pulley friction stand was developed, which tests drive belts under more realistic conditions, and which overcomes limitations with previous equipment, including: 1) a single length of belt exposed to the rotating pulley deteriorated quickly and unrealistically, as the pulley rotated; 2) an unrealistic temperature buildup occurred if the pulley speed approached realistic slip speeds; 3) incomplete data were generated because there is variation in the coefficient of friction at different spots on the same belt, but only one is measured; and 4) slow speeds required to preserve the belt obscured certain phenomenon such as wet slip.

The previously mentioned friction stand is a dynamic stand which captures the belt speed and pulley rotation characteristics of an actual engine. According to the test procedure, a steady state torque is applied to the driven pulley. Then, the machine slowly unwraps the belt from the driven pulley. As the belt unwraps, eventually there will be slip between the belt and the pulley. As the belt unwraps, a data point is taken at every 0.2° of unwrapping angle.

The approach of unwrapping the pulley, versus increasing the torque until slip occurs has the advantage of minimizing the heat buildup at the friction surface that occurs as a slip condition is approached. Because the coefficient of friction is known to increase with temperature, this approach minimizes the increase in temperature and makes the process more benign to the belt.

The data gathered in FIG. 5 were acquired on the previously described friction test stand using a 169 mm crankshaft pulley. The test pulley was tested at a 45° wrap angle under 180 N of slack side tension. To simulate wet-slip conditions water was run over the system at 300 ml/minute. A 20% increase in the coefficient of friction and 45.3% more torque capacity was achieved under a wet slip condition over a conventional multi-ribbed pulley without shear generators. It can be seen that the coefficient of friction between the multi-ribbed belt 14 and driving pulley 10 is increased with the inclusion of spheroids 30. Without wishing to be bound by the theory, it is believed that the spheroids 30 create a localized high pressure area at the belt/pulley interface according to FIG. 4. Localized tension is created in belt 14 as it is stretched within its elastic range over spheroids 30. Thus, the spheroids increase the circumferential friction while causing no undue wear to the belt.

With spheroids 30 in driving pulley 10, should the surface of pulley 10 become wet, the increased coefficient of friction will keep belt 14 from slipping along the faces of pulley 10 causing either an audible squealing noise as the belt slips or a change in speed of the driven item.

Figure 6A:
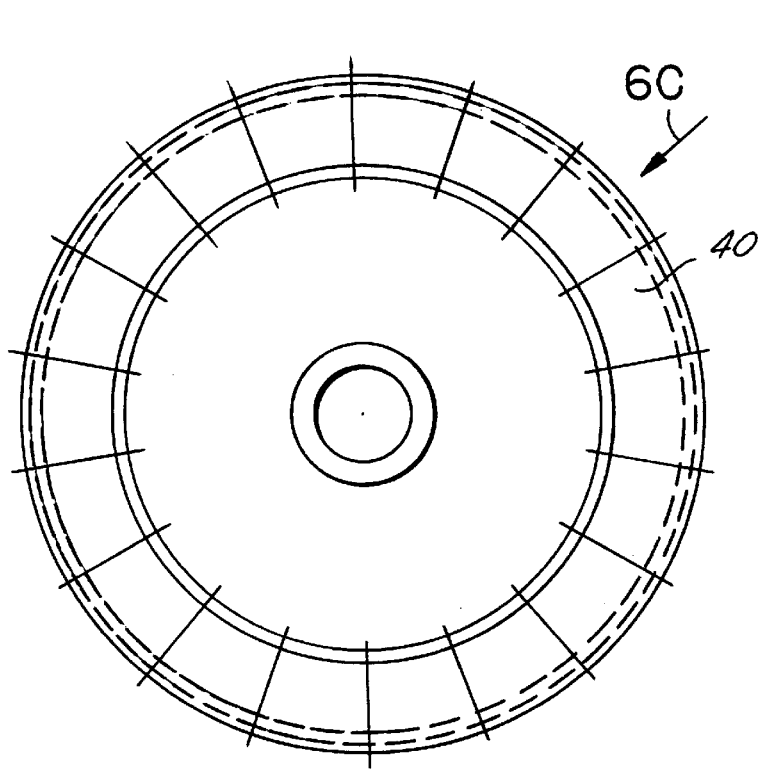
FIG. 6a is a side view detail of driving pulley according to another aspect of the present invention showing the period for a sine wave groove arrangement having a repeating pattern approximately every 20° along the circumference of the pulley.
Figure 6B:
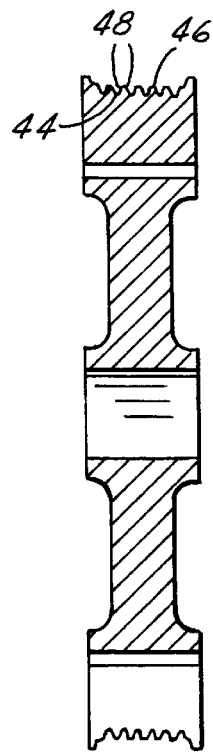
FIG. 6b is a sectional view of a driving pulley according to FIG. 6a, detailing the conical faces that define the ribs and grooves of the pulley.
Figure 6C:
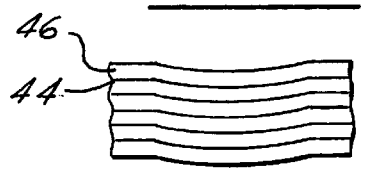
FIG. 6c is an expansion of a portion of the sectional view of FIG. 6b, showing the shear generators as the pulley grooves themselves, with the grooves being shifted left and right in a continuous wave pattern along the circumference of the pulley.

In another embodiment of the invention, the conical faces 48 of the driving pulley 40 are shaped in a continuous sine wave, as shown in FIGS. 6a, 6b and 6c. Pulley 40 has a plurality of grooves 44 and ribs 46. Grooves 44 are shaped and dimensioned so as to receive belt ribs 18 with little clearance space when the belt 14 is in contact with pulley 40. The pattern allows the belt 14 to stay in contact with pulley grooves 44 and ribs 46, which have been formed in a continuous wave pattern so that the circumferential groove runs slightly right and left along the circumference of the driving pulley face 40. The additional shear caused by the irregularity of the driving pulley 40 increases the coefficient of friction between pulley 40 and belt 14 and enables the system to maintain friction during wet slip conditions. The additional shear is not expected to result in additional belt wear.

In a preferred embodiment of the invention, the continuous wave pattern is in the form of a sine wave which repeats every 20° along the circumference of pulley 40. The continuous wave pattern can also repeat at irregular intervals (i.e., 18°, 22°, 17°, 23°, . . . , the total adding to 360°. In another preferred embodiment, the maximum shift in the circumferential grooves 44 is 10% of the width of the rib of a multi-ribbed pulley 10.

While the best mode for carrying out the invention has been described in detail, those familiar with the arts to which this invention relates will recognize alternative designs and embodiments for practicing the invention. Thus, the above-described preferred embodiment is intended to be illustrative of the invention, which may be modified within the scope of the following claims.

I claim:

1. An accessory drive system for an internal combustion engine, comprising:

a plurality of driven pulleys, with at least one of said driven pulleys being operatively connected with a rotating accessory;

a multi-ribbed drive belt; and a driving pulley attached to a driving shaft of the engine, with said driving pulley comprising:

a plurality of conical pulley faces defining at least one circumferential groove in said driving pulley; and a plurality of shear generators extending generally axially from said conical pulley faces into at least one groove such that the shear generators expand the drive belt in a plurality of regions, wherein the shear generators comprise generally spherical protrusions.

2. An accessory drive system according to claim 1, wherein said grooves are V-shaped, with each V-shaped groove having at least one spheroid at approximately the midpoint between the root and the apex of the V.

3. An accessory drive system according to claim 1, with each groove having a spheroid at approximately 20° along the circumference of the pulley.

4. An accessory drive system according to claim 1, with each groove of a multi-ribbed pulley having a spheroid every 20° along the circumference of the pulley.

* * * * *